E. B. BRACKETT.
ENGINE FAN BELT GUARD.
APPLICATION FILED MAR. 15, 1919.
1,340,113.
Patented May 11, 1920.
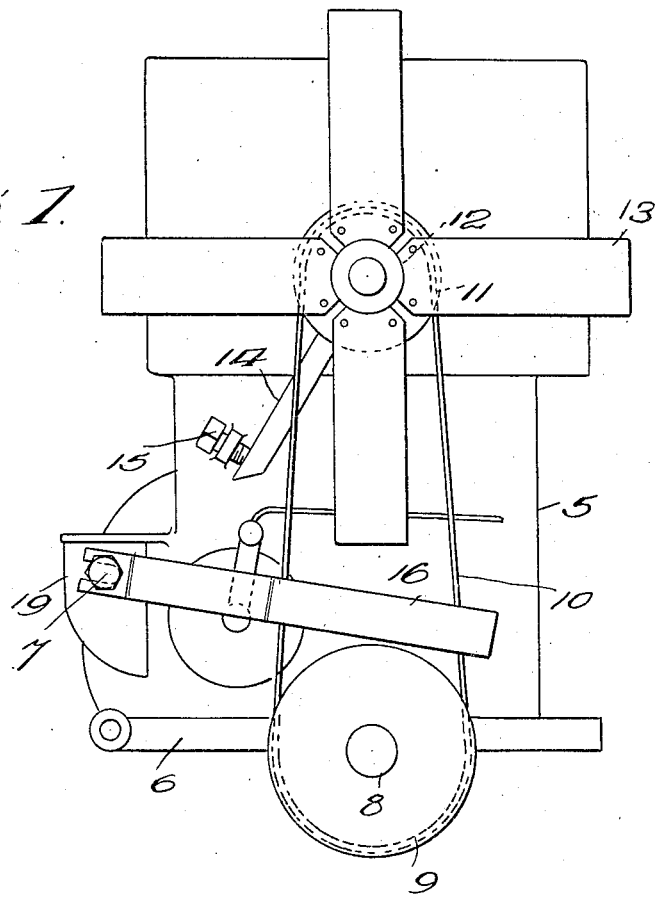
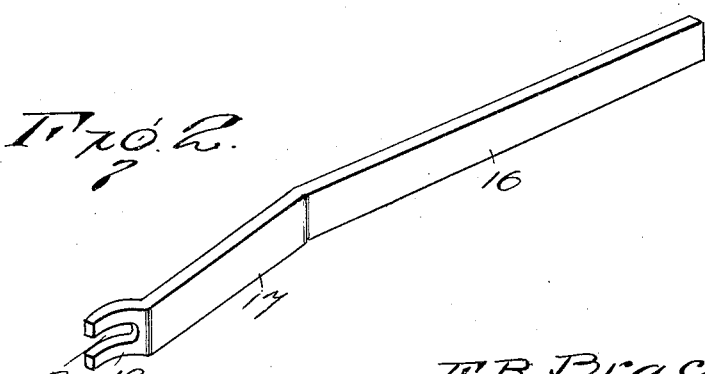
E. B. Brackett
Inventor
By Geo. F. Kimmel
Attorney

UNITED STATES PATENT OFFICE.

EDWARD B. BRACKETT, OF LUFKIN, TEXAS.

ENGINE-FAN-BELT GUARD.

1,340,113.   Specification of Letters Patent.   Patented May 11, 1920.

Application filed March 15, 1919. Serial No. 282,773.

*To all whom it may concern:*

Be it known that I, EDWARD B. BRACKETT, a citizen of the United States, residing at Lufkin, in the county of Angelina and State of Texas, have invented certain new and useful Improvements in Engine-Fan-Belt Guards, of which the following is a specification.

It is a well known fact that in order to prevent the belt connecting the crank shaft with the fan shaft on motor vehicle engines from slipping off, due to excessive vibration to which it is subjected, it is necessary to tighten the belt to a much greater extent than is required to effectively drive the fan and in consequence the belt is unnecessarily and prematurely worn and frequently broken. It is therefore the object of the present invention to provide a simple and inexpensive guard readily attachable beneath the engine bolt heads and capable of maintaining the belt in position upon the pulleys.

With these and other objects in view as will appear as the description proceeds, the invention comprises the novel features, construction, combination and arrangement of elements which will be more fully set forth hereinafter and described in the claim appended hereto.

In the drawings:

Figure 1 represents a front elevation of a conventional type of motor vehicle engine illustrating the improved guard applied thereto.

Fig. 2 represents a perspective view of the guard attached to the engine.

Referring to the drawings in detail, wherein similar reference numerals designate corresponding parts throughout the several views, the numeral 5 indicates the cylinder block of a conventional type of explosive engine provided with the gear case 6 and fastening bolts, one of which is indicated by the numeral 7, by which the case is secured in position upon the cylinder block. The crank shaft 8 is provided with a pulley 9 supporting the fan belt 10 which also extends over a pulley 11 on the fan shaft 12 carrying radiating blades 13 which are rotated, during operation of the engine, and produce a forced draft cooling the engine and producing a circulation of air through the radiator (not shown) to maintain the water or other liquid cooling system in a comparatively cool condition. The fan shaft is supported upon an arm 14 pivotally secured to the gear case 6 and having an extended terminal engaged by an adjusting screw 15 by which the arm is forcibly elevated to produce the desired tension upon the belt 10.

As stated, it is usual practice to so adjust the arm 14 as to maintain the belt 10 in an unnecessarily taut condition to prevent the belt from running up over the flanges of the pulleys 9 and 11 and becoming disengaged therefrom. Therefore, in order to effectively maintain the belt in position upon the pulleys and permit the belt to be operated under less tension and consequently less wear and injury, I provide the belt guard 16 which is constructed of a relatively long narrow strip of sheet metal and is arranged above the crank shaft pulley 9 and directly in front of the belt 10, it being understood that the latter is not liable to slip rearwardly of the pulleys owing to the crank case of the engine which is located directly behind the lower pulley 9 and acts as a guard to prevent the accidental displacement of the belt.

The outer terminal of the guard is offset as at 17 and is terminally curved as indicated at 18 to snugly fit the convex outer surface of the oil filler spout 19 formed integral with the gear case 6 as is common to certain type of vehicle engines, commercially known as Ford automobiles. The curved terminal of the guard is formed with a longitudinal slot 20 receiving the shank of the bolt 7 passing through the spout 19 and when said bolt is tightened in position its head bears against the terminal of the guard firmly clamping the curved end thereof against the convex surface of the bolt and effectively supporting the guard in operative position.

What I claim is:

The combination of an explosive engine including crank and fan shafts, pulleys secured upon said shafts, a belt connecting said pulleys, a cylindrical oil spout, a supporting bolt extending through the spout, and a belt guard extending across the edges of the belt adjacent one of the pulleys and having one terminal curved to snugly fit the external contour of the cylindrical oil spout, the curved extremity of the guard having a slot receiving the shank of the bolt whereby the guard is secured in position upon the engine.

In testimony whereof, I affix my signature hereto.

EDWARD B. BRACKETT.